Aug. 5, 1952      G. M. HALLADAY      2,605,624
COOKING SPOON HOLDER
Filed Sept. 5, 1947
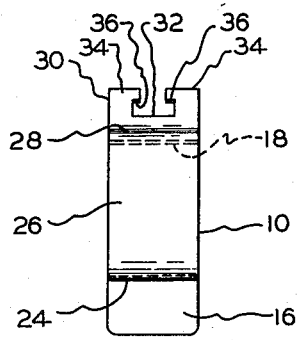
FIG. I
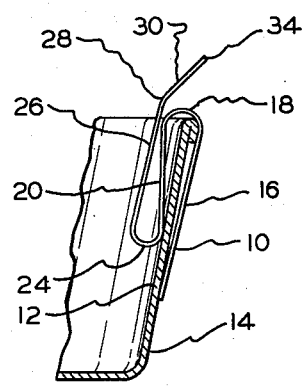
FIG. II
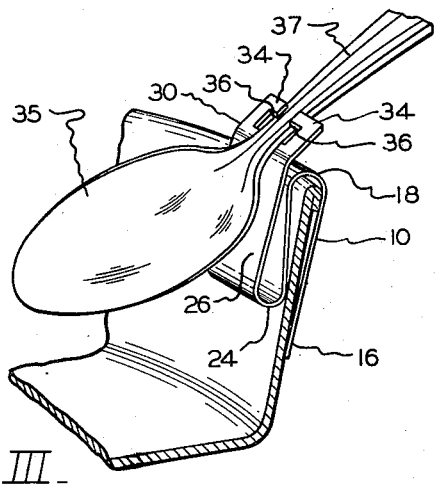
FIG. III
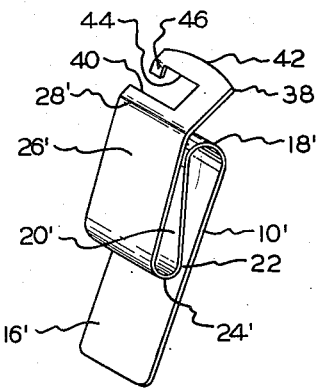
FIG. V
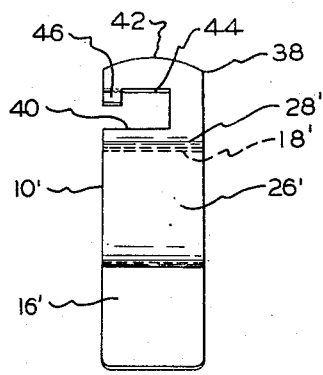
FIG. IV
Inventor
GIRNETH M. HALLADAY
By Beaman & Patch
Attorneys Patented Aug. 5, 1952

2,605,624

UNITED STATES PATENT OFFICE 2,605,624

COOKING SPOON HOLDER

Girneth M. Halladay, Jackson, Mich.

Application September 5, 1947, Serial No. 772,392

1 Claim. (Cl. 65—65)

This invention relates to devices used in connection with cooking utensils and more particularly to means adapted to be associated with a cooking vessel, and to be used for holding a spoon or other like article in a position fixed relative to the cooking vessel.

In certain kinds of cooking, it is found necessary to stir the food being cooked frequently, either in order to prevent the food from burning or to obtain a smooth texture in the cooked food, or for any other reason. To accomplish this stirring, the cook uses, ordinarily, a large spoon, and after she has finished stirring the food, she is faced with the problem of the disposition of the spoon pending its next use in stirring the food. In certain types of saucepans, cooks have found it possible to place the spoon upside down on the handle of the saucepan with the bowl of the spoon extending out over the bowl of the saucepan. The objections to this method are, first, that not all saucepans have the concave handle required to retain the spoon, and, secondly, that the handle of the saucepan oftentimes becomes hot and directly transfers heat to the handle of the spoon, thereby making it impossible for the cook to use the spoon a second time. Another disposition of the spoon has been to place it on the stove adjacent the cooking surface being used. The objections to this method are that it either soils the top of the stove or necessitates the use of another dish to prevent this soiling of the stove, and also that the spoon is liable to become overheated, thereby making it impossible to use it until it has cooled.

In the past, certain spoon holders have been developed to hold the spoon relative to the cooking utensil, but these efforts have not been entirely successful. Some of these spoon holders have held the bowl of the spoon away from the bowl portion of the cooking vessel, thereby allowing the food to drip from the spoon onto the stove. Others have been of unsound design and are, therefore, practically impossible to use, since their holding of the spoon depends upon the establishment of a delicate balance.

A third group of these spoon holders comprises those which will hold the spoon very steadily but are difficult to use, either because the insertion of the spoon is very difficult or the removal of the spoon from its holder is very difficult.

A fourth fault which appears to be present in most of the spoon holders of the first three groups is that the spoon holder tends to conduct heat directly from the pan or vessel in which it is being used to the spoon, thereby making it most uncomfortable in use or practically impossible to use until the spoon has been cooled.

It is, therefore, an object of this invention to provide a simple, inexpensively manufactured spoon holder adapted to be hooked on to the cooking vessel, into which the spoon is easily placed and from which the spoon may be easily withdrawn.

A further object is to provide a spoon holder which will not tend to transmit heat directly from the vessel with which it is being used to the spoon.

A still further object is to provide a spoon holder which is readily removable from the cooking vessel and yet which maintains a tight association with the cooking vessel to properly hold the spoon.

Further objects and advantages of my invention will be apparent from a consideration of the following specification in connection with the appended claim and the accompanying drawings, in which Fig. I is a view in elevation of one form of my spoon holder, Fig. II is a side view in elevation of the spoon holder of Fig. I, with a portion of a cooking vessel shown in broken section, Fig. III is a view in perspective of the form of my spoon holder shown in Figs. I and II, Fig. IV is a view in elevation of another form of my spoon holder, and Fig. V is a perspective view of the spoon holder of Fig. IV.

In the drawings it will be seen that I have shown five figures of my spoon holder, all indicated as being stamped out of a single piece of sheet metal, although I recognize that my spoon holder may be made of various other materials, and particularly that it may be bent and formed from a single piece of wire, and in those forms will accomplish the same result as will those shown in the figures.

In the drawings, the spoon holder 10 is shown clamped to the upstanding side wall 12 of the cooking vessel 14. The spoon holder 10 is constructed with an attachment clip comprising the external downwardly extending clip wall 16, which is bent over as at 18 from where the internal downwardly extending wall 20 is formed and bent so as to approach the external wall 16 and leave an opening 22, which is smaller than the normal thickness of the wall 12. This construction of the wall 16 and the wall 20 will form a resilient clip adapted to be received over the wall 12 and clamp the spoon holder 10 to the cooking vessel 14.

Extending upwardly from the curved lower portion 24 of the downwardly extending wall 20 is the upwardly extending front wall 26, which terminates in a definite fold or bend 28, which is shown to be a slight distance above the curved portion 18.

As shown in the drawings, the spoon retaining portion 30 of the spoon holder 10 is formed of the same strip as the rest of the spoon holder, and comprises a fulcrum edge 32 and a pair of spaced retaining ears 34 having inner retaining shoulders 36.

It will be apparent from the drawings that the front wall 26 is spaced from the inside wall 20 and the curved portion 18 and that the fulcrum edge 32 is likewise so spaced, making it necessary for any heat to travel the length of the wall 26 in order to get to the fulcrum edge 32. Since the spoon holder 10 is made of fairly light weight resilient metal, the fulcrum edge 32 will have little contact with the spoon, thereby not allowing a large amount of heat transfer. The same may be said of the heat transfer possibilities of the shoulders 36.

A spoon 35 may be placed in position for holding by turning it on its side, and inserting the narrow part of the handle 37 between the ears 34 to a point where the handle 37 touches the fulcrum edge 32, at which time the spoon 35 is rotated 90 degrees on its longitudinal axis, the lower side of the spoon handle 37 coming to rest on the fulcrum edge 32, and the upper side of the spoon handle 37 being engaged by the shoulder 36. In this position, the spoon 35 will be held away from all contact with the cooking vessel and the only heat transfer possible will be through the fulcrum edge 32 and the shoulders 36, which must of necessity be almost negligible.

In Figs. IV and V, I have shown a variation of my spoon holder, the variations being apparent in the spoon retaining portions of the spoon holder only. This variation shows a spoon holder 10' having a clip formed of the outside upstanding wall 16' and the inside down-turned wall 20' connected at the curved portion 18'. The upstanding front wall 26' connects at its lower extremity 24' with the inner wall 20' and is formed with a definite bend as at 28'. The spoon retaining portion 38 comprises the fulcrum edge 40 and the spaced hook portion 42 forming the second retaining portion or edge 44. In use, the spoon handle is inserted horizontally into the aperture between the fulcrum edge 40 and the retaining edge 44, the lower side of the spoon handle engaging the fulcrum edge 40, and the upper side of the spoon handle being engaged by the retaining edge 44. The down turned ear 46 helps to prevent inadvertent removal of the spoon from the holder. It will be apparent to those skilled in the art that this modification will not sacrifice the nonheat conducting characteristics of the embodiment of my invention shown in Figs. I, II and III.

Having thus described my invention, what I claim as new and desire to protect by Letters Patent is:

A spoon holder comprising a resilient clip portion shaped to straddle the edge of a cooking utensil, an upwardly extending support portion connected to said clip portion on the part thereof which is disposed on the inside of the cooking utensil, a holder portion connected to said support portion at the upper end thereof and being inclined upwardly and toward said clip portion, said holder portion having a slot defined therein to receive the handle of the spoon, said slot having a lower fulcrum edge adjacent the upper end of said support portion and an upper retainer edge located in spaced relation to said fulcrum edge, above the same and outwardly offset from said fulcrum edge on the clip portion side of the holder whereby a spoon held in said slot is angularly disposed across the edge of the utensil and is supported on the under side upon said fulcrum edge and restrained against rocking movement thereon by engagement by the retainer edge against the upper side of the spoon.

GIRNETH M. HALLADAY.

REFERENCES CITED

The following references are of record in the file of this patent:

UNITED STATES PATENTS

| Number | Name | Date |
|---|---|---|
| 807,840 | Martin et al. | Dec. 19, 1905 |
| 917,350 | O'Reilly | Apr. 6, 1909 |
| 1,304,628 | Thornton | May 27, 1919 |
| 1,483,833 | Potter | Feb. 12, 1924 |
| 1,576,232 | Cooke | Mar. 9, 1926 |

FOREIGN PATENTS

| Number | Country | Date |
|---|---|---|
| 391,131 | France | Aug. 20, 1908 |